United States Patent [19]

Rudert et al.

[11] 4,083,333

[45] Apr. 11, 1978

[54] CYLINDER HEAD CONSTRUCTION FOR AN INTERNAL COMBUSTION ENGINE

[75] Inventors: Wolfgang Rudert, Langenargen; Karlheinz de Lazzer, Friedrichshafen, both of Germany

[73] Assignee: Motoren-und Turbinen-Union Friedrichshafen GmbH, Germany

[21] Appl. No.: 642,651

[22] Filed: Dec. 22, 1975

[30] Foreign Application Priority Data

Dec. 21, 1974 Germany .............................. 2460972

[51] Int. Cl.² ........................... F02F 1/36; F02F 1/40; F02F 1/42
[52] U.S. Cl. ............................................. 123/41.82 R
[58] Field of Search ..................................... 123/41.82

[56] References Cited

U.S. PATENT DOCUMENTS

| | | | |
|---|---|---|---|
| 3,081,755 | 3/1963 | Kotlin | 123/41.82 |
| 3,086,505 | 4/1963 | Bovard | 123/41.82 |
| 3,353,522 | 11/1967 | Ley | 123/41.82 |
| 3,377,996 | 4/1968 | Kotlin | 123/41.82 |
| 3,405,696 | 10/1968 | Zaruba | 123/41.82 |
| 3,420,215 | 1/1969 | Seifert | 123/41.82 |
| 3,491,731 | 1/1970 | Dinger | 123/41.82 |
| 3,744,462 | 7/1973 | Herschmann | 123/41.82 |
| 3,769,948 | 11/1973 | Feichtinger | 123/41.82 |
| 3,818,878 | 6/1974 | Zaruba | 123/41.82 |

Primary Examiner—Charles J. Myhre
Assistant Examiner—R. A. Nelli
Attorney, Agent, or Firm—Craig & Antonelli

[57] ABSTRACT

A fluid-cooled cylinder head construction for an internal combustion engine having two valves for inlet and two valves for exhaust with an injection nozzle or prechamber being arranged centrally of the valve chambers of the inlet and exhaust valves and with cooling fluid entry bores being arranged at the cylinder head circumference along a bottom wall of the cylinder head. Two cooling fluid chambers are provided and arranged one above the other with bores providing the communication between the upper and lower cooling fluid chambers. The lower cooling fluid chamber includes two outer chambers each of which is provided with a set of cooling fluid entry bores with a canal or channel being formed by the injection nozzle or prechamber in a central area which is connected with the outer chambers by two cooling canals arranged between the valve chambers of the inlet valves and the exhaust valves.

19 Claims, 6 Drawing Figures

CYLINDER HEAD CONSTRUCTION FOR AN INTERNAL COMBUSTION ENGINE

The present invention relates to a cylinder head construction, and more particularly to a fluid-cooled cylinder head for an internal combustion engine having two inlet valves, two exhaust valves, and an injection nozzle or prechamber arranged centrally between the valves with cooling fluid bores being arranged at the cylinder circumference in a bottom wall of the cylinder head and with the cylinder head including cooling fluid chambers arranged one above the other connected with each other by openings or bores provided between the respective valve chambers.

One of the most endangered portions of a cylinder head of an internal combustion engine lies in the central area about the injection nozzle or prechamber at the bottom wall of the cylinder head since such area is exposed to extremely high wall temperatures during the operation of the internal combustion engine. In known fluid-cooled cylinder heads, exactly in this endangered area, the cooling fluid passages between lower and upper fluid chambers of the cylinder head are arranged so that, for the intensive cooling of the cylinder head bottom wall, an unfavorable cooling fluid flow exists. Furthermore, in known constructions, casting difficulties are encountered due to the formation of so called "casting fins" which occur at the core joints of the cylinder head during casting. The presence of these thin fins may completely shut off a cooling passage and, are, during subsequent cleaning of the casting, often difficult to remove. Additionally, it may occur that one or more "casting fins" may go undetected during the manufacture of the cylinder head thereby resulting in an unfavorable influence on the cooling-fluid flow in such a way that the affected cylinder head warps, cracks or otherwise becomes damaged after a short operating time of the internal combustion engine.

The present invention is concerned with the task to provide a fluid cooled cylinder head for an internal combustion engine which avoids by simple means the aforementioned shortcomings and which achieves a maximum cooling of the thermally high stressed areas of the cylinder through a casting-technical favorable arrangement of the cooling fluid chambers.

The underlying problems are solved in accordance with the present invention by providing a lower cooling fluid chamber which includes at least two outer chambers with each of the chambers being provided with a set of cooling fluid entry bores. A ring-canal or channel is formed in the cylinder head about an injection nozzle or prechamber with cooling canals extending between the valve chambers of the pair of inlet valves and the pair of exhaust valves connecting the ring canal or channel with the respective outer chambers. By virtue of this arrangement of the cooling fluid chambers a favorable long flow path of the cooling fluid results along the bottom cylinder head within the thermally stressed areas thereby resulting in an intensive cooling of the endangered areas of the cylinder head.

According to a further feature of the present invention, the further guidance of the cooling fluid along the cylinder head bottom is obtained by providing that two lateral walls of an upper cooling fluid chamber extend each between one of the cylinder head side walls and the lateral walls of the valve chambers each of an inlet and exhaust valve to the cylinder head bottom wall and openings each of an inlet and exhaust valve chamber connecting the lower cooling fluid chamber with the two lateral chambers of the upper cooling fluid chamber.

According to yet another feature of the present invention, a favorable core division for the preparation of casting molds is obtained in that the upper and lower cooling fluid chambers are each produced by a separate core with the adjacent cores not touching each other and with the connecting or communicating openings between the cooling fluid chambers being subsequently provided through shaping by a machine tool or the like. By virtue of this arrangement, it is especially advantageous that, through the avoidance of core parting, none of the feared "casting fins" can form. Furthermore, the cost for cleaning the casting decreases whereas, at the same time, the quality of the castings, regarding the surfaces of the cooling canals, is significantly improved.

In order to favorably cool the thermally high stressed exhaust valve chambers, according to a further feature of the present invention, a guide wall is arranged in each of the two lateral chambers of the upper cooling fluid chamber which guide wall extends, as a first wall section, from an inlet valve-side face wall of the cylinder head up to the area of an exhaust valve guide and parallel to the cylinder head bottom wall with a second wall section extending from the exhaust valve guide up to the top of the cylinder head parallel to the exhaust valve guide so that the cooling fluid is preferably guided over the walls of the exhaust valve chambers. This arrangement is especially advantageous when the opening for the discharge of the cooling fluid from the cylinder head is arranged in the area of the inlet valve side since a long flow path results over the exhaust valve chambers.

With the arrangement of the cooling fluid discharge opening in the area of the exhaust valve side, according to the present invention, another fluid guide wall is necessary in each of the two lateral chambers of the upper cooling fluid chamber which guide wall extends from an inlet valve-side face wall of the cylinder head up to the area of an exhaust valve guide and parallel to the cylinder head bottom wall with two additional guide walls each of which are arranged, starting from an exhaust valve guide, between the exhaust valve-side cylinder head face wall, the cylinder head top and the upper walls of the exhaust valve chambers.

Preferably, the temperatures of the cylinder head walls should be as uniform as possible in order to avoid a distortion of the cylinder head; however, the heat load of the various cylinder walls is variably large so that, under equal cooling intensity, different cylinder wall temperatures exist at the various walls of the cylinder head. To account for this temperature differential in the walls of the cylinder head, according to the present invention, a cooling canal passing between the two inlet valve chambers has a smaller cross-sectional opening than the oppositely arranged cooling canal passing between the exhaust valve chambers to thereby create a throttle point so that at the respective sets of the cooling fluid entry bores arranged in the area of the exhaust valves a larger volume flow of the cooling fluid is created. By virtue of this construction, an improved heat removal is obtained corresponding to the larger heat load on the cylinder head.

In a further development of the present invention, a variable cooling intensity in the inlet and exhaust valve areas is additionally realized in that the flow cross-sections of the two sets of the cooling fluid entry bores in the cylinder head bottom wall are different from each other so that one set of the entry bores having the smaller flow cross-section results in the creation of an additional throttle point for the cooling fluid.

To adapt the cooling canal cross-sections to the variably large cooling fluid flows, according to the present invention, the ring canal is preferably narrowed between the injection nozzle or prechamber and the wall of at least one of the adjacent valve chambers through an eccentric arrangement of the injection nozzle or prechamber with respect to the pair of inlet valves and pair of exhaust valves.

According to yet another feature of the present invention, the narrowing of the ring canal with a centrally arranged injection nozzle or prechamber may also be attained by providing a larger formation along the valve chamber walls on both sides of the cooling canals.

Furthermore, for the improvement of the heat transfer from the cylinder head walls to the cooling fluid, according to the present invention, the cooling canals between the valve chambers are shaped through a finish-machining operation.

Additionally, in accordance with the present invention, an improvement of the heat transfer of the cooling fluid is also attained by finish-machining in order to remove the casting surface of the cylinder head bottom wall and the portions of the valve chamber walls on the cooling fluid side facing the injection nozzle or prechamber in as large as possible an area around the injection nozzle or prechamber.

Accordingly, it is an object of the present invention to provide a fluid-cooled cylinder head for an internal combustion engine which avoids by simple means the aforementioned shortcomings and drawbacks encountered in the prior art.

Another object of the present invention resides in providing a fluid-cooled cylinder head for an internal combustion engine which increases the life of the cylinder head and valves by decreasing the operating temperatures of the cylinder head.

Still another object of the present invention resides in providing a fluid-cooled cylinder head for an internal combustion engine which decreases the temperature differential at the respective walls of the cylinder head and reduces thermal stresses and distortions in the cylinder head.

A still further object of the present invention resides in providing a fluid-cooled cylinder head which is relatively simple to manufacture and therefore inexpensive.

These and further objects, features and advantages of the present invention will become more apparent from the following description when taken in connection with the accompanying drawing which shows, for the purposes of illustration only, two embodiments in accordance with the present invention, and wherein.

Figure 1:
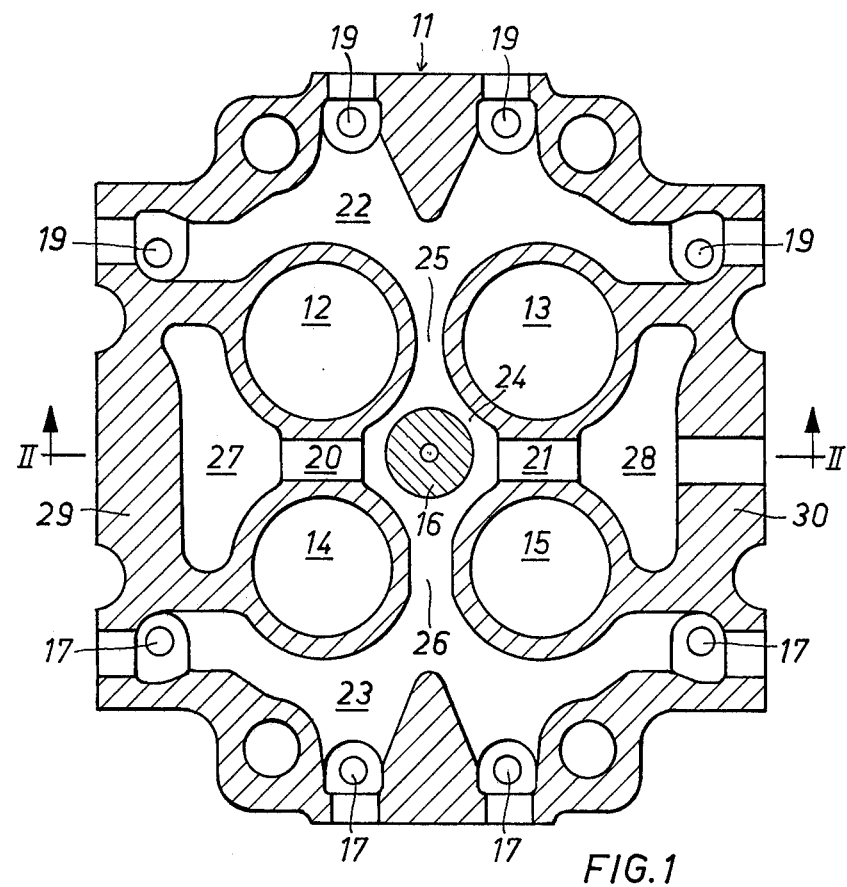
FIG. 1 is a cross-sectional view of a fluid-cooled cylinder head in accordance with the present invention taken along the line I—I of FIG. 2.
Figure 2:
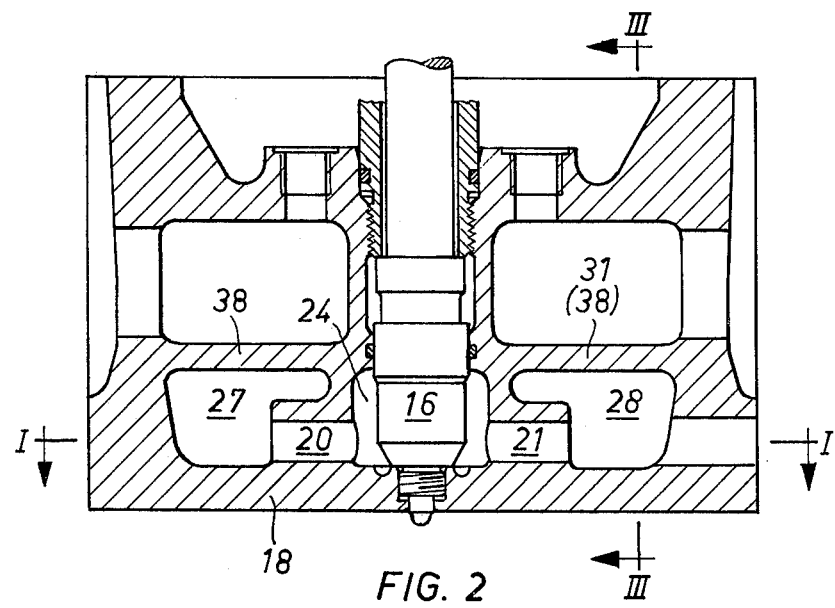
FIG. 2 is a cross-sectional view taken along the line II—II of FIG. 1.

Referring now to the drawings, wherein like reference numerals are used throughout the various views to designate like parts and more particularly to FIGS. 1 and 2, according to these Figures, an internal combustion engine fluid-cooled cylinder head generally designated by the reference numeral 1 is provided with inlet valve chambers 12, 13 and exhaust valve chambers 14, 15 for receiving pairs of inlet and exhaust valves (not shown). An injection valve 16 is disposed centrally between the valve chambers 12, 15 with a plurality of cooling fluid entry bores 17, 19 being arranged in the cylinder head 11 along the circumference of the cylinder at the bottom wall 18. While an injection valve 16 is shown in the drawings, it is understood that a prechamber may be provided in the cylinder head 11 and disposed centrally between the valve chambers 12–15.

Two cooling fluid chambers are arranged in the cylinder head 11 essentially one above the other and are connected with each other by bores or openings 20, 21 extending between the valve chambers 12, 14 and 13, 15, respectively. The lower cooling fluid chamber includes two outer cooling fluid chambers 22, 23 which respectively communicate with the set of entry bores 17, 19. A ring canal or channel 24 is formed in the central area about the injection nozzle 16 or prechamber. Cooling canals or passages 25, 26 are provided and extend between the valve chambers for the inlet valve pairs 12, 13 and the exhaust valve pairs 14, 15 whereby the two outer cooling fluid chambers 22, 23 are connected with the ring canal or channel 24.

The upper cooling fluid chamber includes two lateral cooling fluid chambers 27, 28 of which each extends between a cylinder head side walls 29, 30 and the lateral walls of the valve chambers 12, 14, and 13, 15 of the inlet and exhaust valves up to the cylinder head bottom wall 18. The lateral cooling fluid chambers are respectively connected by the passages openings or bores 20, 21 with the lower outer cooling fluid chambers 22, 23.

By virtue of the construction of the lower outer cooling fluid chambers 22, 23 in communication with the bores or openings 20, 21 a long flow path of the cooling fluid along the cylinder head bottom wall 18 results whereby an intensive cooling of the endangered portions of the cylinder head along the bottom wall 18 is readily realized.

In the preparing of a mold for casting the cylinder head 11, a favorable core division is obtained when the upper lateral cooling fluid chambers 27, 28 and lower outer cooling fluid chambers 22, 23 are each produced by a separate core with the two cores being arranged so as to be out of contact with each other. By this arrangement, no connection between the upper and lower cooling fluid chambers in the rough casting of the cylinder head 11 exists and the communicating bores or openings 20, 21 are therefore produced subsequently by an after-machining process.

Figure 3:
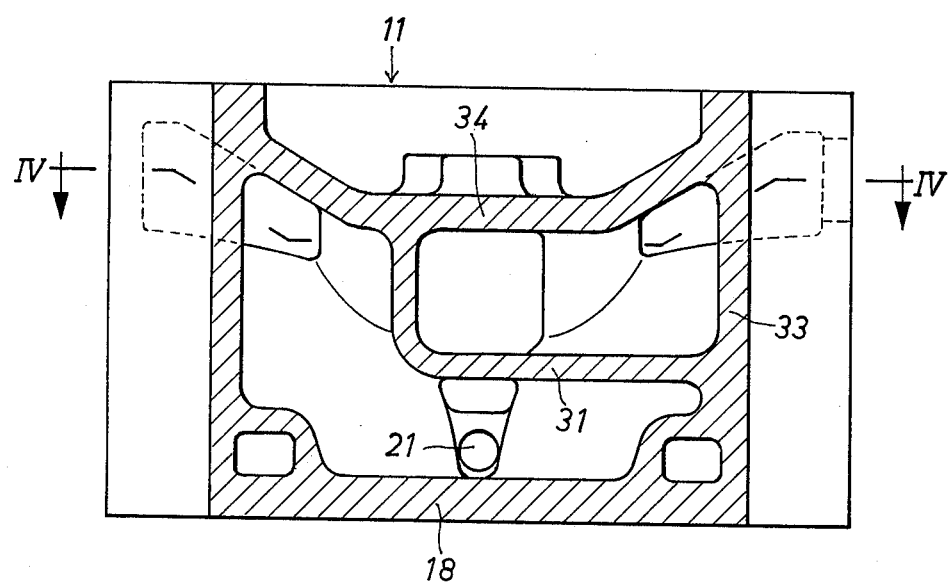
FIG. 3 is a cross-sectional view taken along the line III—III of FIG. 2.
Figure 4:
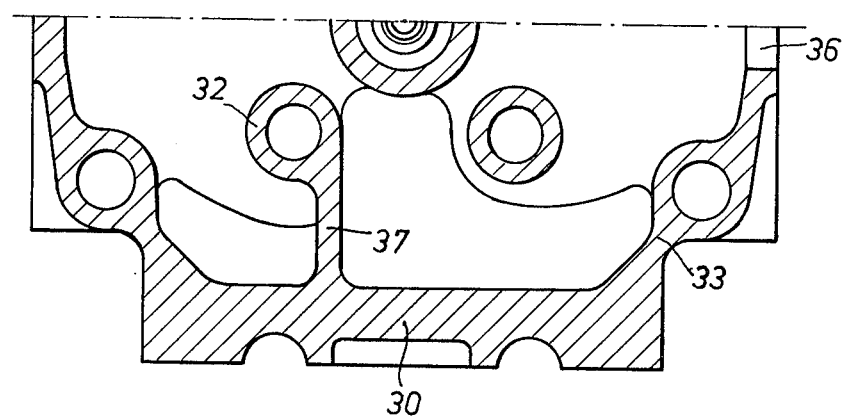
FIG. 4 is a cross-sectional view taken along line IV—IV of FIG. 3.

As shown in FIGS. 3 and 4, a guide wall is arranged in each of the two lateral cooling fluid chambers 27, 28 of the upper cooling fluid chamber which guide wall includes a first wall section 31 extending from a face wall 33 of the cylinder head at the inlet valve side up to the area of the exhaust valve guide 32 and a second wall section 37 extending from the exhaust valve guide 32 up to the top 34 of the cylinder head parallel to the exhaust valve guides 32. A cooling fluid discharge opening or collecting line 36 is located in the area of the inlet valve side and, by virtue of such location, a long flow path of the cooling fluid over the exhaust valve chambers 14, 15 results thereby increasing the cooling efficiency of the cooling fluid in the cylinder head.

Figure 5:
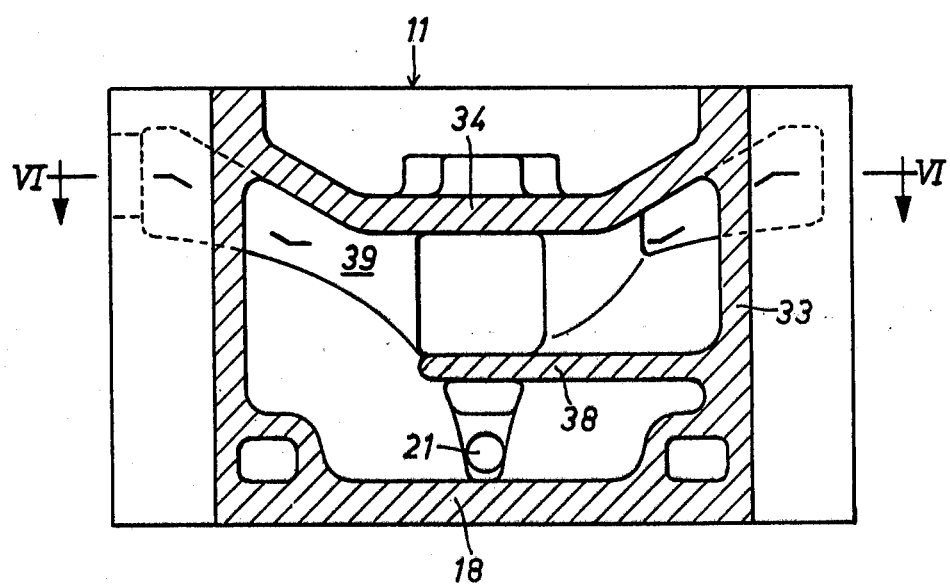
FIG. 5 is a cross-sectional view of a further embodiment of a fluid-cooled cylinder head in accordance with the present invention taken along the line V—V of FIG. 6.
Figure 6:
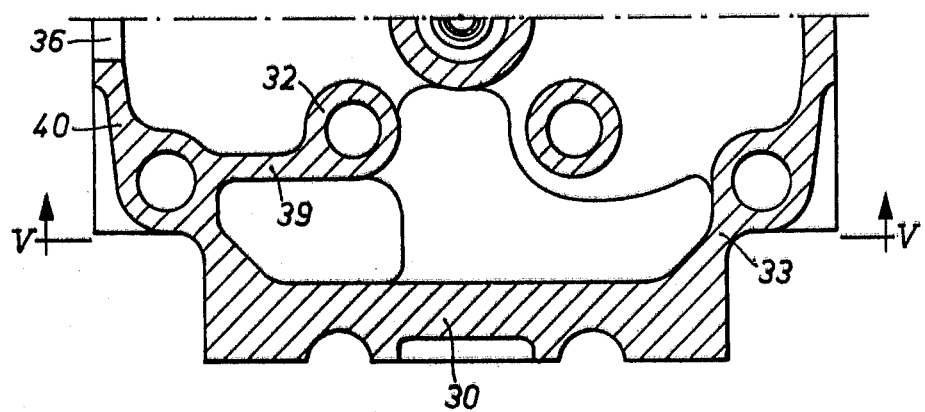
FIG. 6 is a cross-sectional view taken along the line VI—VI of FIG. 5.

As shown in FIGS. 5 and 6, with the cooling fluid discharge opening located in the area of the exhaust valve side, another arrangement of guide walls in the lateral cooling fluid chambers 27, 28 is necessary in order to attain a long flow path for the cooling fluid. In this construction, a guide wall 38 is provided at each of the lateral cooling fluid chambers 27, 28 which wall extends from a face wall 33 at the inlet valve side up to the area of the exhaust valve guide 32 parallel to the cylinder head bottom wall 18 with at least one additional guide wall 39 being arranged in each of the lateral chambers 27, 28 which additional guide wall originates at one of the exhaust valve guides 32 and extends between a cylinder head face wall 40 at the exhaust valve side, the top 34 of the cylinder head and the upper walls of the exhaust valve chambers 14, 15.

As shown most clearly in FIG. 1, a cooling canal 25 extends from the fluid cooling chamber 22 and passes between the inlet valve chambers 12, 13 with the cross-section of the cooling canal 25 being smaller than the cross-section of a cooling canal 26 which extends from the fluid cooling chamber 26 and passes between the exhaust valve chambers 14, 15. By virtue of this arrangement of the cooling canals 25, 26 a throttling point or throttling area for the cooling fluid results. At the set of cooling fluid entry bores 17, arranged in the area of exhaust valves, a larger volume flow of the cooling fluid is ensured thereby so that an improved heat removal is obtained corresponding to a higher heat load or higher thermal stress at the exhaust valve area of the cylinder head.

To further improve the split-up of the cooling fluid flows to the unequally heat-loaded areas or thermally stressed areas of the cylinder head 11, the cross-section of the cooling fluid entry bores 17, 19 are fashioned so as to be different from each other with the cooling fluid entry bores 19 preferably having a smaller cross-sectional opening thereby providing an additional throttling point or throttling area for the cooling fluid.

To adapt the passage cross-sections of the ring canal or channel 24 to the various volume flows of the cooling fluid the injection nozzle 16 or prechamber is eccentrically arranged with respect to the valve chambers 12–15 so that a narrow passage is formed between the injection nozzle 16 or a prechamber and the adjacent valve chamber walls. The narrowing passage of the ring canal 24, with a centrally located injection nozzle 16 or prechamber, may also be accomplished by providing a corresponding formation or enlargement of the involved valve chamber walls.

Additionally, an improved heat transfer for cast cylinder heads may also be obtained by the removal of the casting skin from the cast cylinder head 11. In order to make this heat transfer effect useful, the cooling canals 25, 26 are subsequently shaped by a finish-machining operation and the casting surface of the cylinder head bottom wall 18 is removed from as large as possible an area around the injection nozzle 16 or a prechamber and the portions of the walls of the valve chambers 12–15 on the cooling fluid side and facing the injection nozzle 16 or prechamber by an after-finishing operation.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A fluid-cooled cylinder head for an internal combustion engine which engine includes two valves each for inlet and exhaust, each of the two inlet valves and each of the two exhaust valves being arranged in respective valve chamber means, a combustion means arranged between the inlet valve chamber means and the exhaust valve chamber means, and cooling fluid entry means arranged at a cylinder circumference, the cylinder head comprising: a first cooling chamber means for receiving a cooling fluid, a second cooling chamber means for receiving a cooling fluid disposed below said first cooling chamber means, the cooling fluid entry means communicating with said second cooling chamber means for delivering cooling fluid thereto, bore means arranged between an inlet valve chamber means and an adjacent exhaust valve chamber means for communicating said first cooling chamber means with said second cooling chamber means, an annular channel means for receiving a cooling fluid formed about the combustion means, said bore means terminating in said annular channel means, and passage means for communicating said second cooling chamber means with said annular channel means, said bore means, said passage means and said annular channel means being arranged such that the cooling fluid flows from the cooling fluid entry means through said second cooling chamber means into said passage means and from said passage means into said annular channel means and through said bore means into said first cooling chamber means so as to define a long flow path of cooling fluid along a bottom of the cylinder head.

2. A cylinder head according to claim 1, wherein said second cooling chamber means includes two cooling chambers spaced from each other and from said annular channel means, said passage means being arranged between the inlet valve chamber means and between the exhaust valve chamber means.

3. A cylinder head according to claim 2, wherein at least one cooling fluid entry means is provided for each of said cooling chambers.

4. A cylinder head according to claim 3, wherein said combustion means is an injection nozzle means arranged in the cylinder head.

5. A cylinder head for an internal combustion engine which includes two valves each for inlet and exhaust, each of the two inlet valves and each of the two exhaust valves being arranged in respective valve chamber means, a combustion means arranged between the inlet valve chamber means and the exhaust valve chamber means, and cooling fluid entry means arranged at a cylinder circumference, the cylinder head comprising: a first cooling chamber means for receiving a cooling fluid, a second cooling chamber means for receiving a cooling fluid disposed below said first cooling chamber means, the cooling fluid entry means communicating with said second cooling chamber means for delivering cooling fluid thereto, means for communicating said first cooling chamber means with said second cooling chamber means, an annular channel means formed about the combustion means, passage means arranged between the inlet valve chamber means and between the exhaust valve chamber means for communicating said second cooling chamber means with said annular channel means, said second cooling chamber means including two cooling chambers spaced from each other and from said annular channel means with at least one cooling fluid entry means being provided for each of said cooling chambers, said combustion means including an injection nozzle means arranged in the cylinder head, the cylinder head further including interconnected side walls, a bottom wall, and a top wall, each of said valve chamber means including lateral walls, said first chamber means including a pair of spaced lateral cooling chambers, each of said lateral cooling chambers extending between one of the side walls of the cylinder head and one of the lateral walls of the valve chamber means up to said bottom wall of the cylinder head, and wherein said means for communicating said first cooling chamber means and said second cooling chamber means includes passages communicating the respective lateral cooling chambers with said annular channel means.

6. A cylinder head according to claim 5, wherein each of the exhaust valve chamber means includes exhaust valve guide means, and wherein at least one guide wall is provided in each of said lateral cooling chambers for guiding the flow of the cooling fluid, said guide wall including a first wall section extending from a face wall of the cylinder head at an inlet valve side up to an area of said exhaust valve guide means parallel to said bottom wall of the cylinder head, and a second wall section extending from said exhaust valve guide means substantially parallel thereto up to said top wall of the cylinder head.

7. A cylinder head according to claim 5, wherein each of the exhaust valve chamber means includes an exhaust valve guide means, and wherein at least one guide wall is provided in each of said lateral cooling chambers for guiding the flow of cooling fluid, said guide wall extending from a face wall at an inlet valve side of the cylinder head up to an area of said exhaust valve guide means parallel to said bottom wall of the cylinder head, and at least one additional guide wall arranged between a further face wall of the cylinder head at an exhaust valve side extending from said exhaust valve guide means to said top wall of the cylinder head and upper walls of the exhaust valve chamber means.

8. A cylinder head for an internal combustion engine which engine includes two valves each for inlet and exhaust, each of the two inlet valves and each of the two exhaust valves being arranged in respective valve chamber means, a combustion means arranged between the inlet valve chamber means and the exhaust valve chamber means, and cooling fluid entry means arranged at a cylinder circumference, the cylinder head comprising: a first cooling chamber means for receiving a cooling fluid, a second cooling chamber means for receiving a cooling fluid disposed below said first cooling chamber means, the cooling fluid entry means communicating with said second cooling chamber means for delivering cooling fluid thereto, means for communicating said first cooling chamber means with said second cooling chamber means, an annular channel means formed about the combustion means, passage means arranged between the inlet valve chamber means and between the exhaust valve chamber means for communicating said second cooling chamber means with said annular channel means, said second cooling chamber means includes two cooling chambers spaced from each other and from said annular channel means with at least one cooling fluid entry means being provided for each of said cooling chambers, said combustion means including an injection nozzle means arranged in the cylinder head, the passage means arranged between the inlet valve chamber means has a smaller cross-sectional dimension that the passage means arranged between the exhaust valve chamber means so as to form a throttling point for the cooling fluid whereby a larger volume flow of the cooling fluid is realized in an area of the exhaust valve chamber means.

9. A cylinder head according to claim 8, wherein each of said cooling fluid entry means is fashioned as a bore, and wherein one of said bores has a cross-sectional dimension which is less than the cross-sectional dimension of the other bore whereby an additional throttling of the cooling fluid is effected.

10. A cylinder head according to claim 9, wherein said injection nozzle means is eccentrically arranged in the cylinder head with respect to the inlet valve chamber means and the exhaust valve chamber means whereby at least a portion of said annular channel means has a smaller cross-sectional dimension than the remainder of said annular channel means so as to effect a throttling of the cooling fluid.

11. A cylinder head according to claim 9, wherein said injection nozzle means is arranged in the cylinder head centrally of the inlet valve chamber means and the exhaust valve chamber means, and wherein at least a portion of one of the inlet valve chamber means and the exhaust valve chamber means is provided with enlarged wall sections such that at least a portion of said annular channel means has a smaller cross-sectional dimension than the remainder of said annular channel means so as to effect the throttling of the cooling fluid.

12. A cylinder head according to claim 3, wherein said combustion means is a prechamber arranged in the cylinder head.

13. A cylinder head for an internal combustion engine which includes two valves each for inlet and exhaust, each of the two inlet valves and each of the two exhaust valves being arranged in respective valve chamber means, a combustion means arranged between the inlet valve chamber means and the exhaust valve chamber means, and cooling fluid entry means arranged at a cylinder circumference, the cylinder head comprising: a first cooling chamber means for receiving a cooling fluid, a second cooling chamber means for receiving a cooling fluid disposed below said first cooling chamber means, the cooling fluid entry means communicating with said second cooling chamber means for delivering cooling fluid thereto, means for communicating said first cooling chamber means with said second cooling chamber means, an annular channel means formed about the combustion means, passage means arranged between the inlet valve chamber means and between the exhaust valve chamber means for communicating said second cooling chamber means with said annular channel means, said second cooling chamber means including two cooling chambers spaced from each other and from said annular channel means with at least one cooling fluid entry means being provided for each of said cooling chambers, said combustion means includes a pre-chamber arranged in the cylinder head, and the cylinder head further includes interconnected side walls, a bottom wall, and a top wall, each of said valve chamber means including lateral walls, said first chamber means including a pair of spaced lateral cooling chambers, each of said lateral cooling chambers extending between one of the side walls of the cylinder head and one of the lateral walls of the valve chamber means up to said bottom wall of the cylinder head, and wherein said means for communicating said first cooling chamber means and said second cooling chamber means includes passages communicating the respective lateral cooling chambers with said annular channel means.

14. A cylinder head according to claim 13, wherein each of the exhaust valve chamber means includes exhaust valve guide means, and wherein at least one guide wall is provided in each of said lateral cooling chambers for guiding the flow of the cooling fluid, said guide wall including a first wall section extending from a face wall of the cylinder head at an inlet valve side up to an area of said exhaust valve guide means parallel to said bottom wall of the cylinder head, and a second wall section extending from said exhaust valve guide means substantially parallel thereto up to said top wall of the cylinder head.

15. A cylinder head according to claim 14, wherein each of the exhaust valve chamber means includes an exhaust valve guide means, and wherein at least one guide wall is provided in each of said lateral cooling chambers for guiding the flow of cooling fluid, said guide wall extending from a face wall at an inlet valve side of the cylinder head tup to an area of said exhaust valve guide means parallel to said bottom wall of the cylinder head, and at least one additional guide wall arranged between a further face wall of the cylinder head at an exhaust valve side extending from said exhaust valve guide means to said top wall of the cylinder head and upper walls of the exhaust valve chamber means.

16. A cylinder head for an internal combustion engine which includes two valves each for inlet and exhaust, each of the two inlet valves and each of the two exhaust valves being arranged in respective valve chamber means, a combustion means arranged between the inlet valve chamber means and the exhaust valve chamber means, and cooling fluid entry means arranged at a cylinder circumference, the cylinder head comprising: a first cooling chamber means for receiving a cooling fluid, a second cooling chamber means for receiving a cooling fluid disposed below said first cooling chamber means, the cooling fluid entry means communicating with said cooling chamber means for delivering cooling fluid thereto, means for communicating said first cooling chamber means with said second cooling chamber means, an annular channel means formed about the combustion means, passage means arranged between the inlet valve chamber means and between the exhaust valve chamber means for communicating said second cooling chamber means with said annular channel means, said second cooling chamber means including two cooling chambers spaced from each other and from said annular channel means with at least one cooling fluid entry means being provided for each of said cooling chambers, said combustion means includes a prechamber arranged in the cylinder head, and the passage means arranged between the inlet valve chamber means has a smaller cross-sectional dimension than the passage means arranged between the exhaust valve chamber means so as to form a throttling point for the cooling fluid whereby a larger volume flow of the cooling fluid is realized in an area of the exhaust valve chamber means.

17. A cylinder head according to claim 16, wherein each of said cooling fluid entry means is fashioned as a bore, and wherein one of said bores has a cross-sectional dimension which is less than the cross-sectional dimension of the other bore whereby an additional throttling of the cooling fluid is effected.

18. A cylinder head according to claim 17, wherein said prechamber is eccentrically arranged in the cylinder head with respect to the inlet valve chamber means and the exhaust valve chamber means whereby at least a portion of said annular channel means has a smaller cross-sectional dimension than the remainder of said annular channel means so as to effect a throttling of the cooling fluid.

19. A cylinder head according to claim 17, wherein said prechamber is arranged in the cylinder head centrally of the inlet valve chamber means and the exhaust valve chamber means, and wherein at least a portion of one of the inlet valve chamber means and the exhaust valve chamber means is provided with enlarged wall sections such that at least a portion of said annular channel means has a smaller cross-sectional dimension than the remainder of said annular channel means so as to effect a throttling of the cooling fluid.

* * * * *